March 7, 1950  J. HAVLÍČEK  2,499,825
ELECTRIC JOINT
Filed Jan. 23, 1947  2 Sheets-Sheet 2
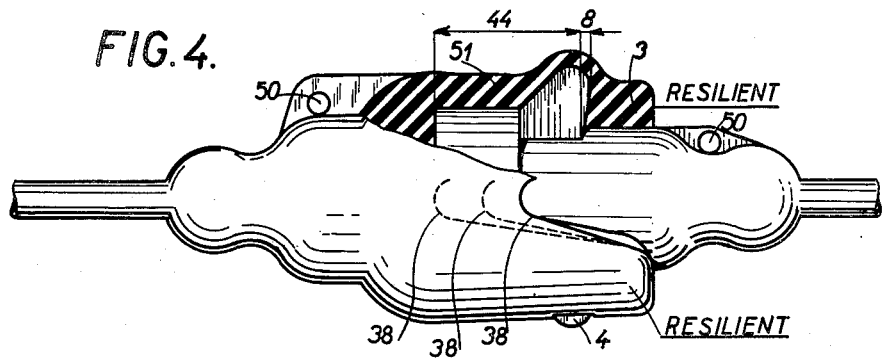
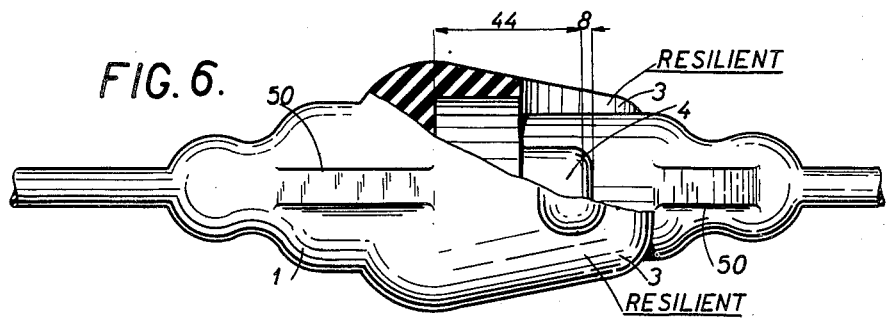
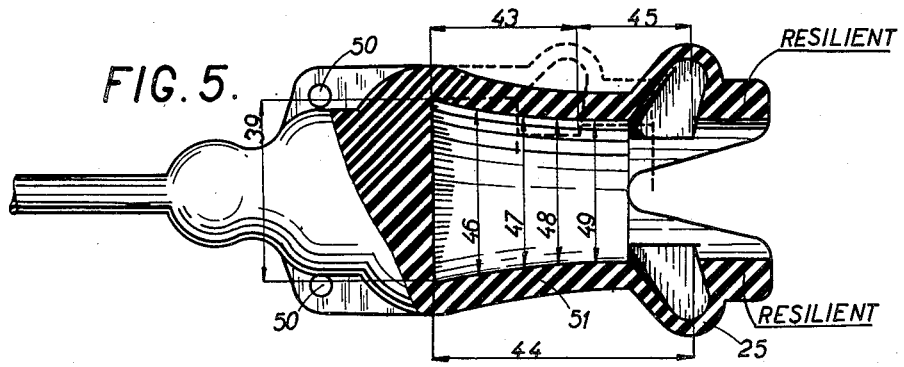
INVENTOR:
JOSEF HAVLÍČEK,
BY
*Ernest P. Marmorek,*
HIS AGENT.

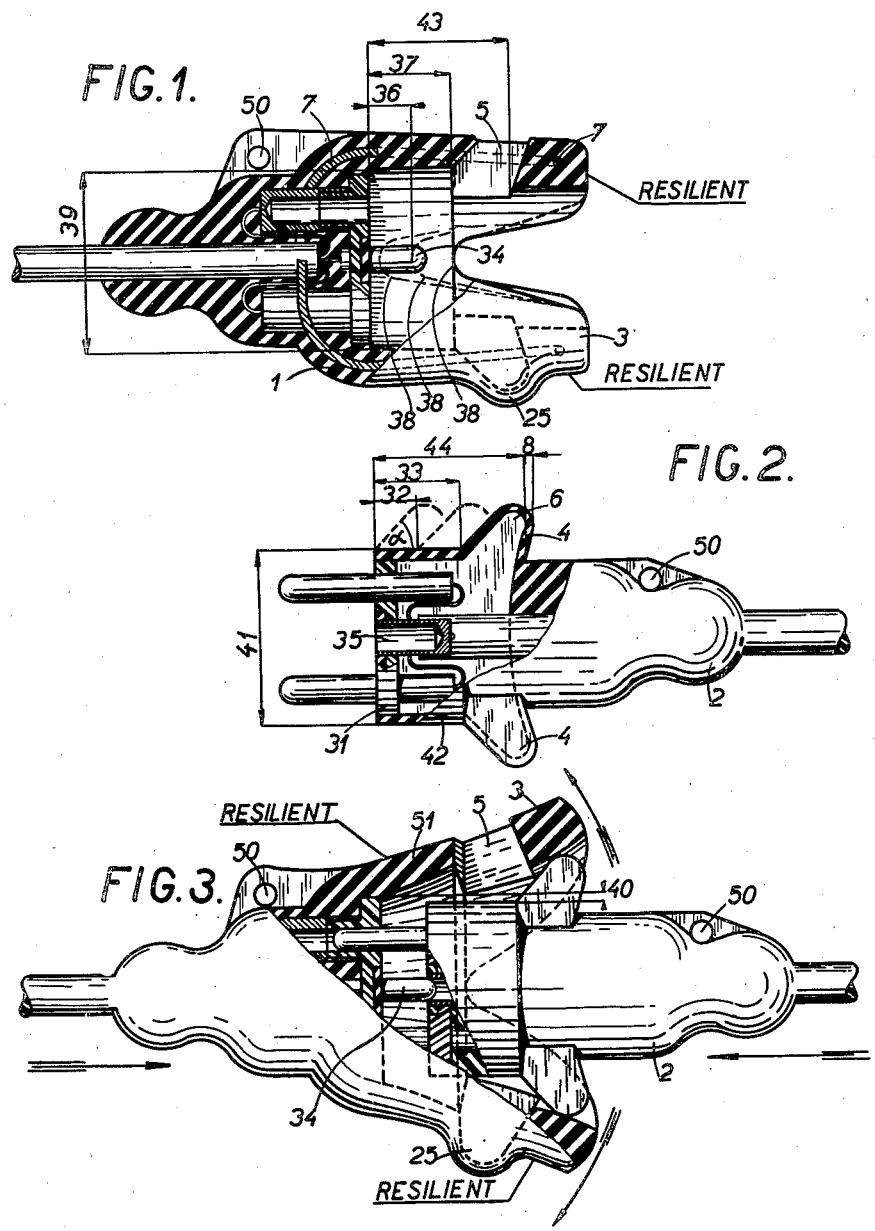

Patented Mar. 7, 1950

2,499,825

UNITED STATES PATENT OFFICE 2,499,825

ELECTRIC JOINT

Josef Havlíček, Prague, Czechoslovakia

Application January 23, 1947, Serial No. 723,853
In Germany April 20, 1942

Section 1, Public Law 690, August 8, 1946
Patent expires April 20, 1962

5 Claims. (Cl. 173—328)

The object of the present invention relates to an electric connection mechanism serving for the electric and mechanical joining of two or more parts of an electric lighting or power service connection. The invention relates more particularly to such electric connection mechanism of the self-locking type wherein the body is entirely rubber-sheathed and which are utilized mainly in provisional lighting and power service connections. As is well known in the art, such mechanism consist of a plug and socket which in a connected state constitute some kind of watertight joint.

Since such a joint must be capable of withstanding mechanical tensile strain, it has already been suggested to design a joint wherein the rubber sheath of the one part of the joint is in the form of a tube extending over the other part thereof and through its proper elasticity holds both parts of the joint together. In such designs merely part of the elasticity and strength of the rubber material are utilized without the strain attaining the breaking point.

The hitherto known types of joints which are provided with a rubber sheath lose their elasticity through the influence of light and the rubber tube rim constituting the essential portion of the joint is then unable to bring about the necessary adhesion of both joint elements wherefore this type of joints is unreliable and within a short service period becomes unsafe as unable of withstanding the increased tensile strain.

The joint according to the present invention is devoid of such drawbacks and allows, under unfavourable working conditions, a very considerable tensile strain without any risk of disconnecting the joint and respectively the contacts, the advantage of a quick and reliable connecting and disconnecting the joint remaining unrestricted.

The invention will now be described with reference to the accompanying drawing in which the device according to this invention is illustrated merely by way of example and in which:

Fig. 1 is an elevational view, partly in section, of a socket in accordance with the invention;

Fig. 2 is an elevational view, partly in section, of the corresponding plug;

Fig. 3 is an elevational view, partly in section, showing the plug and socket in their mutual position before connection;

Fig. 4 is an elevational view, partly in section, showing the plug and socket after interconnection;

Fig. 5 is a sectional detail view of the socket illustrating the reduced diameter of the socket on tensile strain; and Fig. 6 is an elevational view, partly in section, similar to Fig. 4, but showing the connected plug and socket angularly displaced by 90° against Fig. 4.

The socket 1 of any suitable shape is rubber-sheathed, the cylindrically tubular, sleeve shaped rubber sheath being extended to form one or a plurality of yokes or extensions 3 provided with recesses or apertures or eyelets 5 and forming a homogeneous unit with the remaining rubber sheath. The shape of said apertures 5 corresponds to the shape of the projections 4 provided on the body of the contact plug 2. On inserting the plug 2 into the socket 1 the elastic yokes 3 are very easily widened by the tangential thrust of said projections 4 and on the plug 2 resting on the bottom of the socket 1 the yokes 3 either clenching in automatically through their eyelets 5 or being by a predetermined force pulled over the projections 4 in such manner that the stiffened or only reinforced eyelet 5 clasps into the recessed saddle 8 of said projection 4. The amount of the force necessary for pulling the yoke 3 over projection 4 may be suitably adjusted by selecting conveniently the thickness of the yoke 3, the grade of material wherefrom it is produced, and the size, grade and thickness of the reinforcing member 7, as well as by adjusting the incidence angle of the projection 4 and the like.

After clenching the yokes 3 on the projections 4 a mechanically strong and electrically dependable bond is realized whereby the connected installation elements are secured against accidental breaking of the electric circuit even under very considerable tensile strain would exceed the breaking point of the material of the yoke 3 or projection 4 disconnection of the joint parts could take place.

Obviously the joint of the above disclosed design may be of an inverted construction, the socket 1 being then provided with projections 4 and the plug 2 with yokes 3 and/or both said parts may be provided with the required number of projections and yokes.

In order to increase the safety against disruption said yokes 3 may be provided with reinforcement members 7 of a different material than are the yokes 3 made of, e. g. of a fabric, of harder rubber, buna, etc. Alternately the projections 4 may be provided with stiffening members 6, e. g. of Bakelite, hard rubber, porcelain, etc.

In those cases where the electric installation is liable to be subjected to very rough handling and exposed to the influence of mud, moisture and water and especially in those cases where the reinforcement 6 of the projections 4 could suffer from shocks of the joint against the soil and where an earth pin is used, the joint may be arranged as follows:

The fixing eyelet 5 of the yoke 3 is closed by a diaphragm or wall 25, see Figs. 1, 2, 3 and 4, forming an integral portion of the yoke 3 and thus an indivisible portion of the socket 1. Thus the eyelet 5 is transformed into an adequate recess or cavity 5 corresponding to the fix projection 4. Obviously such protecting wall 25 may have any suitable thickness and external shape. Aid wall 25 protects the inserted fixing projection 4 of the contact plug 2 in the connected position, Fig. 4, against shocks, in the case of rough handling, against damaging and breaking when falling on the hard soil, as said wall 25 softens the impact of the shock, especially in those cases where said projection 4 is either entirely or only in part of a material more brittle than rubber or devoid of a rubber sheath.

In those cases where the electric installations are to have a protecting earth conductor and said plug 2 is to be used, the electric joint of the disclosed design is accommodated to this requirement in the following manner:

The starting point 30 of the projection 4 on the plug 2 is transferred from the seat surface 31 by a certain distance 32 or 33 in such manner that the beginning of the inclined plane of the projection 4, i. e. the distance 33 will be greater or at elast equal to the depth of the socket in a normal installation. In order to preserve the principle of the joint and not to impair its function on insertion, even with the use of an earth conductor 34 in socket 1, see Figs. 1 and 3, and an earthing cavity 35, see Fig. 2, in the contact plug 2, it will be necessary to raise at least one seat 38, see Figs. 1 and 4, by a certain amount 36 or 37. These distances may be chosen at will, but a preferred embodiment is that where the distances are chosen so that 36=32, 37=33. It makes no difference if these seats are raised equally or unequally. In practice an equal bilateral raising of the seats 38 has proved well. It is to be emphasized that in those cases where 36=32 and 37=33, the inside dimensions 39 of the socket must be somewhat increased as against the dimension 41 of plug 2 to maintain the relation $$40 = \frac{39 - 41}{2}$$

the value of 40 being greater than zero. The increase may be such that on inserting the plug 2 is entering smoothly the socket 1 and the yoke 3 is enabled to open easily in view of the convenient recesses of the seats 38, as is shown in Fig. 3.

In order to ensure, after achieving the connection of both elements, i. e. the plug 2 and socket 1, a perfect adhesion of the elastic walls 51, Fig. 5, of said yoke 3 on the surface 42, Fig. 2, of the plug 2, it is necessary to provide for the distance 43, Fig. 1, to be always smaller than the distance 44, Fig. 2.

The underlying principle can be clearly seen in Fig. 5. We indicate the difference 44−43=45, see Figs. 1, 2, 5. By extending the distance 43 by a certain length 45 to get the total distance 44, see Fig. 5, the inner aperture 39 (oval 39, dia. 39 or the like) will be reduced or narrowed by such analogy, so as to form the inner shapes 46, 47, 48, 49. Such reduction of shape may occur only in the case of the socket 1 being empty. On inserting the plug 2 which according to Fig. 3 is to enter the socket quite freely, the walls 41 of the socket 1 on the yoke 3 being pulled over and clenched behind the projection 4 are unable to bend through, but adhere with a predetermined and in the production adjustable gripping tension to the surface 42 of the plug 2, as indicated in Figs. 4 and 6. Thereupon there is no more clearance 40 between the inner surface 39 of the socket 1. This arrangement permits compliance with any safety regulations concerning earth conductors, preventing at the same time moisture or water to penetrate to the contact without hampering in any way the easy and convenient handling of the joint, as the insertion may be effected without any fatigue with a minimum amount of force (0, 1, 2, 3 . . . kg.) and disconnection of the joint achieved does not occur accidentally even under a very high pull.

Hitherto, in the practical use of various installation elements these essential and delicate points of the joints have been unable to be suspended on walls, ceilings, columns, etc., where they would be protected against the rough handling conditions occurring in provisional installations. These delicate joints had to be laid directly on the ground thus being exposed to rough shocks, etc. This may be avoided now by providing either the socket 1 or the plug 2 or both joint elements with one or a plurality of eyelet shaped suspension members 50 integrally arranged thereon, Figs. 1–6.

I claim:

1. In an electric connection mechanism for use with interengageable opposite electrical terminals, in combination, an insulation plug member associated near one end with at least one of said terminals and including a side wall and a plurality of rigid projections extending at an inclination from the side wall of said plug and radially arranged thereon and inclined rearwardly of the end of the plug, a socket including a longitudinal sleeve associated with at least one opposite terminal and arranged to receive said plug in telescopic relation, said sleeve being composed of insulating material and elastic and adapted to be stretched lengthwise and having recess forming extensions, each recess corresponding in radial positioning and surrounding surface contour to a projection on said plug, each plug projection arranged to engage a recess and the positioning of the recesses relative to the sleeve dimensions and the positioning of the projections relative to the plug dimensions so arranged that said sleeve will be elongated and tensioned sufficiently, and the inclination and rigidity of the projection being sufficient, to prevent disengagement.

2. In an electric connection mechanism for use with interengageable opposite electrical terminals, in combination, an insulation plug member associated near one end with at least one of said terminals and including a side wall and a plurality of rigid projections extending at an inclination from the side wall of said plug and radially arranged thereon and inclined rearwardly of the end of the plug, a socket including a longitudinal sleeve associated with at least one opposite terminal and arranged to receive said plug in telescopic relation and having an interior contour substantially corresponding to the exterior of said plug, said sleeve being composed of insulating material and elastic and adapted to be stretched lengthwise whereby it will contract in a direction perpendicular thereto and having recess forming extensions, each recess corresponding in radial positioning and surrounding surface contour to a projection on said plug, each plug projection arranged to engage a recess and the positioning of the recesses relative to the sleeve dimensions and the positioning of the projections relative to the plug dimensions so arranged that said sleeve will be elongated and tensioned sufficiently, and the inclination and rigidity of the projection being sufficient, to prevent disengagement and to be contracted laterally for closely surrounding said plug to seal the same.

3. In an electric connection mechanism for use with interengageable opposite electrical terminals, in combination, an insulation plug member associated near one end with at least one of said terminals and including a side wall and a plurality of rigid projections extending at an inclination from the side wall of said plug and radially arranged thereon and inclined rearwardly of the end of the plug, a socket including a longitudinal sleeve associated with at least one opposite terminal and arranged to receive said plug in telescopic relation and having an interior contour substantially corresponding to the exterior of said plug, said sleeve being composed of insulating material and elastic and adapted to be stretched lengthwise whereby it will contract in a direction perpendicular thereto and having apertured extensions, each aperture corresponding in radial positioning and surrounding surface contour to a projection on said plug, each plug projection arranged to engage an aperture and the positioning of the apertures relative to the sleeve dimensions and the positioning of the projections relative to the plug dimensions so arranged that said sleeve will be elongated and tensioned sufficiently, and the inclination and rigidity of the projection being sufficient, to prevent disengagement and to be contracted laterally for closely surrounding said plug to seal the same.

4. In an electric connection mechanism for use with interengageable opposite electrical terminals, in combination, a hollow plug member associated near one end with at least one of said terminals and including a side wall and a plurality of hollow projections extending at an inclination from the side wall of said plug and radially arranged thereon and inclined rearwardly of the end of the plug, a solid member disposed on the interior of said plug and projections, and adapted to be lined thereby, for stiffening the same, a socket including a longitudinal sleeve associated with at least one opposite terminal and arranged to receive said plug in telescopic relation and having an interior contour substantially corresponding to the exterior of said plug, said sleeve being composed of insulating material and elastic and adapted to be stretched lengthwise whereby it will contract in a direction perpendicular thereto and having recess forming extensions, each recess corresponding in radial positioning and surrounding surface contour to a projection on said plug, each plug projection arranged to engage a recess and the positioning of the recesses relative to the sleeve dimensions and the positioning of the projections relative to the plug dimensions so arranged that said sleeve will be elongated and tensioned sufficiently, and the inclination and rigidity of the projection being sufficient, to prevent disengagement and to be contracted laterally for closely surrounding said plug to seal the same.

5. In an electrical connector, including at least one metallic male terminal and at least one metallic female terminal adapted removably to be electrically interconnected therewith, and an insulating element surrounding each of said male and female terminals, in combination with, latching means for maintaining said terminals interengaged, comprising, a member on each insulating element for telescoping interconnection, the member of one element forming a plug and including an end surface near the terminal thereof, a side wall, and a plurality of rigid off-set projections spaced from said end surface for a predetermined distance and extending laterally from said side wall and being inclined flaring outwardly and rearwardly relative to said end surface, said members of the other element forming a socket including a tube to receive at least a portion of said plug and including a recessed base surface interiorly of said tube near the terminal thereof for receiving said end surface of said plug in abutment, and a plurality of flap extensions integral with said tube, said tube being elastic sufficiently to be axially extended by manual force, and each extension being elastic and resilient and being, independently of the other, extendable and resiliently tiltable outwardly of said tube, each extension having a recess conforming to, and arranged to cooperate with, a projection of said plug for latching therewith, said recesses spaced from said base surface for a distance greater than said predetermined distance to latch each extension with a recess under tension, the inclination of said projections being so arranged that said axially directed tension applying at each recess will restrain accidental lateral unlatching thereof from the projection.

JOSEF HAVLÍČEK.

REFERENCES CITED

The following references are of record in the file of this patent:

UNITED STATES PATENTS

| Number | Name | Date |
| --- | --- | --- |
| 1,845,793 | Ireland | Feb. 16, 1932 |
| 2,037,630 | Hudson | Apr. 14, 1936 |
| 2,151,897 | Chaplin | Mar. 28, 1939 |
| 2,201,578 | Grohsgal | May 21, 1940 |
| 2,379,942 | Webber | July 10, 1945 |
| 2,411,846 | Bir | Dec. 3, 1946 |
| 2,430,593 | Windsor | Nov. 11, 1947 |

FOREIGN PATENTS

| Number | Country | Date |
| --- | --- | --- |
| 718,387 | France | Nov. 4, 1931 |